US010583486B2

(12) United States Patent
Gatto et al.

(10) Patent No.: US 10,583,486 B2
(45) Date of Patent: Mar. 10, 2020

(54) HOT ISOSTATIC PRESSING APPARATUS AND HOT ISOSTATIC PRESSING METHODS FOR REDUCING SURFACE-AREA CHEMICAL DEGRADATION ON AN ARTICLE OF MANUFACTURE

(71) Applicant: HONEYWELL INTERNATIONAL INC., Morris Plains, NJ (US)

(72) Inventors: Christopher David Gatto, Gilbert, AZ (US); James J Cobb, Casa Grande, AZ (US); Aaron Moreth, Mesa, AZ (US); Alex Holmes, Tempe, AZ (US); Brian Hann, Avondale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 355 days.

(21) Appl. No.: 15/397,950

(22) Filed: Jan. 4, 2017

(65) Prior Publication Data

US 2018/0185918 A1 Jul. 5, 2018

(51) Int. Cl.

| | |
|---|---|
| ***B29C 43/10*** | (2006.01) |
| ***B22F 3/15*** | (2006.01) |
| ***B22F 3/10*** | (2006.01) |
| ***B22F 3/03*** | (2006.01) |
| ***B22F 5/00*** | (2006.01) |
| ***B30B 11/00*** | (2006.01) |

(52) U.S. Cl.

CPC .................. *B22F 3/15* (2013.01); *B22F 3/03* (2013.01); *B22F 3/1007* (2013.01); *B22F 5/009* (2013.01); *B30B 11/002* (2013.01); *B22F 2003/1014* (2013.01); *B22F 2003/153* (2013.01); *B22F 2301/10* (2013.01); *B22F 2301/15* (2013.01); *B22F 2998/10* (2013.01)

(58) Field of Classification Search

CPC .......... B01J 3/06; B01J 3/2203; B22F 3/1258; B29C 43/02

See application file for complete search history.

(56) References Cited

U.S. PATENT DOCUMENTS

| | | | |
|---|---|---|---|
| 2,926,981 | A | 3/1960 | Stout et al. |
| 3,627,521 | A | 12/1971 | Vordahl |
| 3,700,435 | A | 10/1972 | Chandhok |
| 3,992,200 | A | 11/1976 | Chandhok |
| 4,032,335 | A | 6/1977 | Zapf et al. |
| 4,038,738 | A | 8/1977 | Fischmeister et al. |

(Continued)

OTHER PUBLICATIONS

Extended EP Search Report for Application No. 18150088.5 dated Jun. 6, 2018.

*Primary Examiner* — Joseph S Del Sole
*Assistant Examiner* — Thu Khanh T Nguyen
(74) *Attorney, Agent, or Firm* — Lorenz & Kopf, LLP

(57) ABSTRACT

A method for hot isostatic pressing includes the steps of providing or obtaining an article of manufacture, which optionally includes a copper or nickel alloy, disposing the article of manufacture in a shroud, the shroud defining an enclosed volume wherein the article of manufacture is disposed, the shroud being configured as a multi-piece joined structure to retard gaseous mass transport from outside the shroud to inside the enclosed volume, disposing the shroud in a containment vessel of a hot isostatic pressing apparatus and disposing a getter material in the shroud and/or in the containment vessel, and introducing an inert gas at an elevated temperature and pressure into the containment vessel for hot isostatic pressing.

17 Claims, 2 Drawing Sheets

(56) References Cited

U.S. PATENT DOCUMENTS

| | | | |
|---|---|---|---|
| 4,098,450 | A | 7/1978 | Keller et al. |
| 4,108,652 | A | 8/1978 | Ogawa et al. |
| 4,151,400 | A | 4/1979 | Smith, Jr. et al. |
| 4,552,710 | A | 11/1985 | Rigby et al. |
| 4,717,551 | A | 1/1988 | Bernauer et al. |
| 4,983,339 | A | 1/1991 | Boncoeur et al. |
| 5,505,248 | A | 4/1996 | Aghajanian et al. |
| 6,331,271 | B1 | 12/2001 | Bergman |
| 7,135,141 | B2 | 11/2006 | Han et al. |
| 7,931,855 | B2 | 4/2011 | Berglund et al. |
| 8,449,279 | B2 | 5/2013 | Nakai et al. |
| 2016/0184895 | A1 | 6/2016 | Raisson et al. |

HOT ISOSTATIC PRESSING APPARATUS AND HOT ISOSTATIC PRESSING METHODS FOR REDUCING SURFACE-AREA CHEMICAL DEGRADATION ON AN ARTICLE OF MANUFACTURE

TECHNICAL FIELD

The present disclosure generally relates to apparatus and methods employed in the manufacture of various articles. More particularly, the present disclosure relates to hot isostatic pressing apparatus and hot isostatic pressing methods for reducing surface-area chemical degradation on an article of manufacture.

BACKGROUND

Hot isostatic pressing, or "HIP," is a method of manufacturing articles, which is used to reduce the porosity of metals and to increase the density of ceramic materials. The HIP process subjects the article to both an elevated temperature and an isostatic gas pressure in a high-pressure containment vessel. For pressurization, an inert gas is supplied, to reduce the any chemical reactions that may occur between the gas and the article. The vessel is heated, causing the pressure inside the vessel to increase. The heated, high-pressure gas is applied to the material from all directions, i.e., in an "isostatic" manner.

While various efforts are made during the HIP process to exclude reactive gasses, such as oxygen, from the containment vessel, experience has shown that it is difficult to remove all reactive gas molecules from the vessel prior to the introduction of the inert gas. Accordingly, though small, some amount (trace amounts, e.g., less than 10% by volume, or less than 5% by volume) of reactive gas remains in the containment vessel during the HIP process, which often results in some degree of contamination of the article. For example, where some amount of oxygen remains in the containment vessel, and the article is metallic, metal oxides may form on the surface of the article during the HIP process. Such oxides detrimentally affect the material properties of such articles, for example by altering the thermal conductivity thereof, and such oxides further interfere with subsequent manufacturing steps, such as plating, coating, and diffusion bonding.

In order to reduce the presence of reactive gasses in the HIP containment vessel, various attempts have been made to employ the use of reactive gas "getter" materials, i.e., materials that physically or chemically trap and remove the reactive gas molecules from the gas phase within the containment vessel. For example, U.S. Pat. No. 4,552,710 to Rigby et al. discloses a HIP process for MnZn ferrite magnetic transducer head, which employs the use of surrounding MnZn scrap pieces and an optional overlay of a getter material within the containment vessel in order to prevent the MnZn ferrite material from undergoing chemical change during the HIP process. U.S. Pre-grant Publication 2016/0184895 to Raisson et al. discloses a HIP process for densifying a pre-alloyed powder, which uses a getter to capture $N_2$ and CO that may be evolved from the sintering of the powder. U.S. Pat. No. 3,992,200 to Chandhok discloses a HIP process using powdered metal in a mold, surrounded by a secondary pressure media in solid, particle form, which may include a getter material. Further, U.S. Pat. No. 3,627,521 to Vordahl discloses a HIP process using an iron-containing powdered metal in a collapsible container, wherein the collapsible container also includes a solid-form getter material.

It is thus apparent that the prior art remains deficient of suitable HIP apparatus and methods for inhibiting detrimental surface reactions, on a manufactured article undergoing HIP processing, caused by reactive gasses in the HIP containment vessel, without the need for close contact with scrap or packing materials and the like that could damage the article during HIP processing. The present disclosure advances the prior art by addressing at least this need. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure provides the hot isostatic pressing apparatus and hot isostatic pressing methods for reducing surface-area chemical degradation on an article of manufacture. In one exemplary embodiment, a method for hot isostatic pressing includes the steps of providing or obtaining an article of manufacture, which optionally includes a copper or nickel alloy, disposing the article of manufacture in a shroud, the shroud defining an enclosed volume wherein the article of manufacture is disposed, the shroud being configured as a multi-piece joined structure to retard gaseous mass transport from outside the shroud to inside the enclosed volume, disposing the shroud in a containment vessel of a hot isostatic pressing apparatus and disposing a getter material in the shroud and/or in the containment vessel, and introducing an inert gas at an elevated temperature and pressure into the containment vessel for hot isostatic pressing.

In another exemplary embodiment, a hot isostatic pressing apparatus includes a sealable containment vessel comprising a first gaseous atmosphere comprising an inert gas and trace amounts of a reactive gas, the first gaseous atmosphere being at a first temperature and a first pressure, a first shroud disposed in the containment vessel, the first shroud defining an enclosed volume, the first shroud being configured as a multi-piece joined structure to retard gaseous mass transport from outside the shroud to inside the enclosed volume, a getter material incorporated within the first shroud and/or within the containment vessel, wherein the getter material has an amount of the reactive gas chemically or physically adsorbed thereto, and a solid, non-powdered article of manufacture having a surface area disposed in the enclosed volume of the first shroud.

This brief summary is provided to describe select concepts in a simplified form that are further described in the detailed description. This brief summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
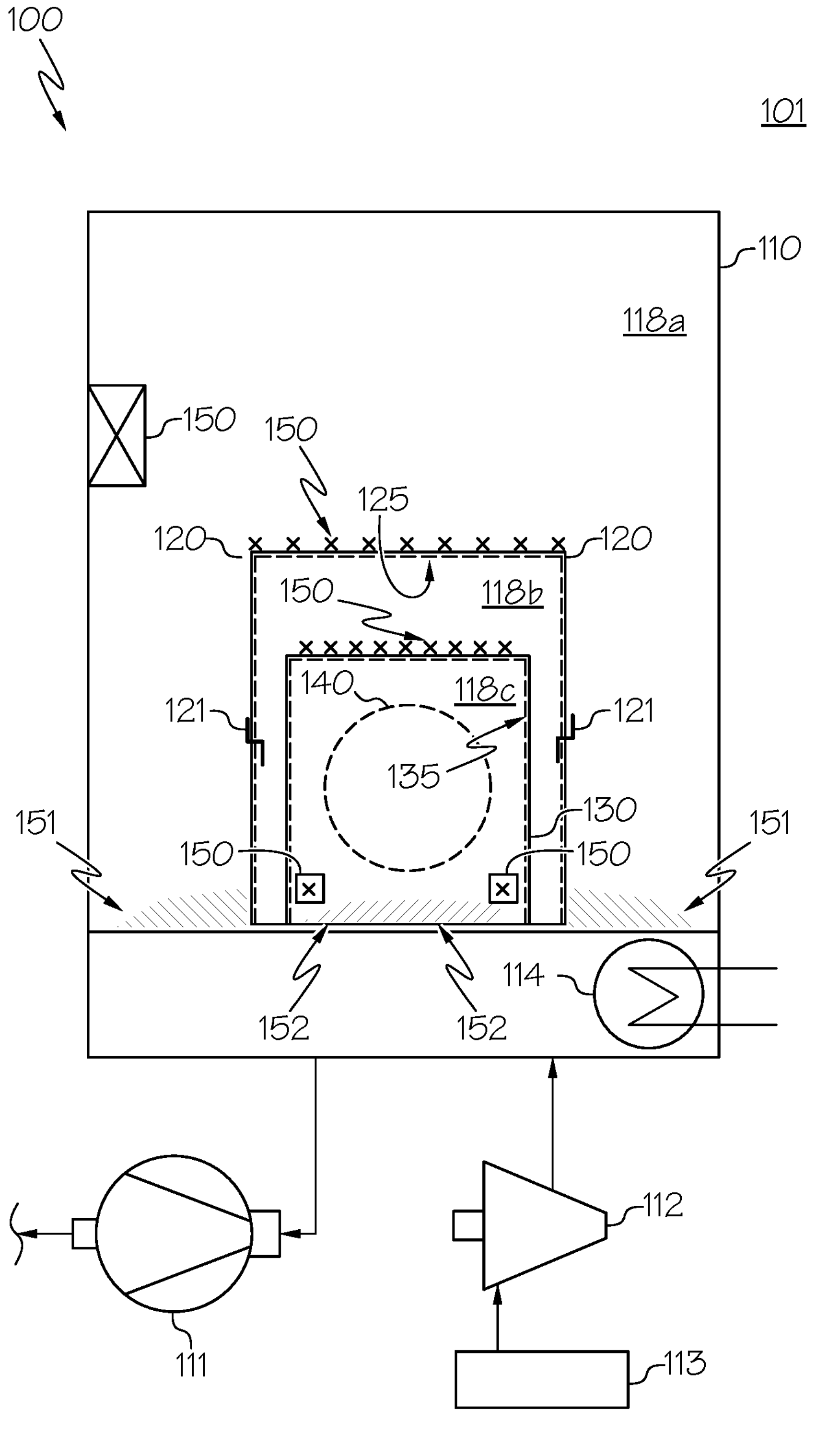
FIG. 1 is a cross-sectional view of a HIP apparatus in accordance with some embodiments of the present disclosure.

The following detailed description is merely exemplary in nature and is not intended to limit the invention or the application and uses of the invention. As used herein, the word "exemplary" means "serving as an example, instance, or illustration." Thus, any HIP apparatus or method embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. As further used herein, the word "about" means a possible variance (+/−) of the stated value of up to 10%, or alternatively up to 5%. Furthermore, there is no intention to be bound by any expressed or implied theory presented in the preceding technical field, background, brief summary, or the following detailed description. For example, the present disclosure discusses mass transport, which should be understood as a non-limiting theory.

As initially noted, the present disclosure provides improved HIP methods and HIP apparatus, in connection with an article of manufacture. In general, as used herein, the term "HIP method" refers to the treatment of any article with an inert gas at greater-than-ambient temperatures and greater-than-ambient pressures for a period of time, wherein the inert gas is applied against the article from substantially all directions. In some embodiments, exemplary greater-than-ambient temperatures may range from about 900° F. to about 2,400° F. (about 482° C. to about 1320° C.). Exemplary greater-than-ambient pressures may range from about 7,350 psi to about 45,000 psi (about 50.7 MPa to about 310 MPa). An exemplary period of time may range from about 30 minutes to about 48 hours. An exemplary inert gas is argon (Ar), or more broadly any of the noble gasses. Particular temperatures, pressures, periods of time, and inert gasses may be selected for a particular article including a particular material based on HIP principles that have been well-established in the art.

The aforementioned exemplary HIP method may be executed in a HIP apparatus. In general, as used herein, the term "HIP apparatus" refers to any device or means capable of containing the article and supplying there-against the inert gas at the above noted greater-than-ambient temperatures and greater-than-ambient pressures. Some exemplary HIP apparatus include a sealable containment vessel operably coupled with a vacuum pump, a compressed inert gas source, and a heat exchanger. The containment vessel encloses the article of manufacture, and may be provided in any shape or size. The vacuum pump evacuates the containment vessel of standard atmospheric gasses such as oxygen and nitrogen. The compressed inert gas source supplies the inert gas at a suitable operating pressure, in place of the standard atmospheric gasses, within the containment vessel. Further, the heat exchanger maintains the containment vessel at a suitable operating temperature.

The HIP method performed using the HIP apparatus desirably improves the material properties, such as density and porosity, of the article of manufacture. In general, as used herein, the term "article of manufacture" refers to any solid piece, or any collection of solid pieces, that has previously undergone some manufacturing process, and that has a defined surface area and configuration. The term article of manufacture is thus used to distinguish from powdered alloys disposed in a mold, collapsible container, or the like, which have yet to take solid shape and form. Articles of manufacture may include any material susceptible to improve with HIP processing, such as metal-alloy articles and ceramic articles. An exemplary metal alloy is a nickel alloy, such as a nickel-based superalloy. Another exemplary alloy is a copper alloy. Exemplary, non-limiting articles of manufacture include rotating machine components, such as turbine components, for example turbine wheels and disks, and in particular dual alloy turbine wheels that undergo diffusion bonding during the HIP process.

Reference was previously made to the term getter material in connection with the use of such material in a HIP process. As used herein, broadly speaking, the term "getter material" refers to any material, in any shape or form, that is capable of removing a particular gas (or gasses) from a mixture of a plurality of gasses (by physical or chemical means), and maintaining said particular gas or gasses adsorbed or chemically bonded with the material in solid form such that said particular gas or gasses is (are) substantially incapable of disassociating from the getter material and rejoining the mixture of gasses. In the context of HIP processing, those gasses that are desirably removed by the getter material are those that may chemically degrade the surface of the article of manufacture. For example, as to any article of manufacture, nitrogen-containing gasses (such as $N_2$) may react to form surface nitrides, carbon-containing gasses (such as CO or $CO_2$) may react to form surface carbide, and oxygen-containing gasses (such as CO, $CO_2$, or $O_2$) may react to form oxides. Experience has shown that $O_2$ is particularly damaging to metal-alloy articles of manufacture during HIP processing, the resultant metal oxides undesirably reducing thermal conductivity at the surface of the article and inhibiting concurrent/subsequent plating, coating, and diffusion bonding processes. Getter materials are thus selected in the context of the particular gas/gasses that are desired to be removed. As a non-limiting example, titanium (Ti) and zirconium (Zr) based getter materials have found application in the removal carbon, nitrogen, and particularly oxygen from a mixture of gasses. Further, the person having ordinary skill in the art is aware of other getter materials and their known uses.

In accordance with some embodiments of the present disclosure, the inventive HIP methods may employ the use of a shroud (or multiple shrouds) placed within the HIP apparatus containment vessel and enclosing the article of manufacture. As used herein, the term "shroud" refers to any device that substantially or wholly encloses an interior volume. The shroud may be of any shape and size, and consequently its interior volume may be of any shape and size. Exemplary shrouds provide an interior volume of sufficient shape and size to wholly contain the article of manufacture. Possible, non-limiting shapes include those that are to some extent spherical, those that are to some extent cylindrical, those that are to some extent cuboid, those that are to some extent conical, and those that are to some extent pyramidal, among other shapes. A shroud may be specially configured (with regard to shape and size) for a particular application (i.e., for a particular article of manufacture). Moreover, a shroud may be initially provided in two or more pieces, which are then joined together with the article or manufacture enclosed therein, for ease of use. Joining may be accomplished by any method, such as welding, mechanical fastening, peripheral interlocking (such as a double-walled lip), and the like.

The shroud may generally include any material, but in some embodiments, the shroud material is selected to withstand the elevated temperatures and pressures encountered within the containment vessel during the HIP process without being substantially deformed or otherwise altered in shape and size. By virtue of its multi-piece joining, the shroud is thus configured to retard or inhibit mass transport into the interior volume of the shroud. One example, as noted above, is joining using a double-walled lip, wherein the double walled lip is responsible for retarding or inhibiting mass transport into the shroud. The driving force for such gaseous mass transport is provided by the elevated pressure during HIP processing in the containment vessel, as the pressure of the containment vessel is increased for normal HIP operations. Suitable materials for the shroud include ceramic materials, such as earth-based ceramic materials (e.g., kaolinite) or alumina. Methods for controlling the strength of ceramic materials are generally known in the art, and include the use of various additives, mechanical processing, and heat treatments. Optionally, the shroud material may include the getter material disposed within its enclosed volume (in addition to the article of manufacture. In such applications, the getter material should be kept physically separate and apart from the article of manufacture at all time during HIP processing.

Reference is now made to FIG. 1, which provides a cross-sectional view of a HIP apparatus 100 in accordance with some embodiments of the present disclosure. HIP apparatus 100 includes containment vessel 110, which is sealable with respect to the outside atmosphere 101. Operably coupled with containment vessel 110 is vacuum pump 111, which is provided to withdraw standard atmospheric gasses (i.e., $O_2$ and $N_2$) from within the containment vessel 110, compressor 112, which is provided to supply a compressed inert gas (e.g., Ar) to the containment vessel 110 (the inert gas being provided from inert gas source 113), and a heat exchanger 114, which is provided to control the temperature within the containment vessel 110.

Disposed within the containment vessel 110 are a first shroud 120 and a getter material 150. The first shroud 120 may be placed anywhere within the containment vessel 110, and it may occupy any volume fraction thereof. Likewise, the getter material 150 may be placed anywhere (or in multiple locations) within the containment vessel 110, and it may occupy any volume fraction thereof. As noted above, the first shroud 120 may be provided in two or more parts to allow for easy access to its enclosed volume, and the first shroud 120 therefore includes some connection and/or sealing means 121, such as a weld line, a double-walled lip, or any mechanical fastening means. The first shroud 120 is made of material 125, such as a ceramic, as noted above. Optionally, the containment vessel 110 may further include a non-reactive material 151, such as silica sand, disposed anywhere around, about, underneath, and/or over the first shroud 120 for purposes of further sealing and inhibition of fluid flow/convection/mass transport.

Disposed and contained wholly within the first shroud 120, optionally, are a second shroud 130 and further getter material 150. By necessity, the second shroud 130 is smaller in size as compared to the first shroud 120, but itself may be of any shape or configuration that is similar or dissimilar with respect to the first shroud 120. Within the second shroud 130, the further getter material 150 may be provided in any amount and at any location. Accordingly, the second shroud 130 and further getter material 150 may each, independently, occupy any volume fraction of the enclosed interior of the first shroud 120. The second shroud 130 is made of material 135, which may be the same or different as compared to the material 125. Further, as described above with regard to the first shroud 120, the second shroud 130 may be a multi-piece device, sealed/joined together in any manner as noted above (not illustrated). Optional non-reactive material (not illustrated) may also be provided anywhere within the first shroud 120, in the manner and for the purposes described above with regard to the containment vessel 110.

Disposed and contained wholly within the second shroud 130 (or the first shroud 120 if no second shroud 130 is provided) is an article of manufacture 140. As noted above, article of manufacture may be of any shape or size, and may be positioned anywhere in the second shroud 130 and occupy any volume fraction thereof. The article of manufacture 140 should not be in physical contact with the getter material 150 in the second shroud 130, if present. In this regard, optionally included within the second shroud are further getter material 150 and a non-reactive stop-off material 152 (such as alumina), which is used to physically separate the second shroud 130 from direct contact with the article of manufacture 140. The optional further getter material 150 and stop-off material 152 may be positioned in any manner within the second shroud 130 and about, around, underneath, or over the article of manufacture 140, and may each independently occupy any volume fraction of the interior enclosure of the second shroud 130.

With continued reference to FIG. 1, the enclosed volume of the containment vessel 110 defines a first gaseous atmosphere **118*a*, the enclosed volume of the first shroud 120 defines a second gaseous atmosphere 118*b*, and the enclosed volume of the second shroud 130 defines a third gaseous atmosphere 118*c*. Due to the joining of the shrouds, mass transport is retarded or inhibited from atmosphere 118*a* to atmosphere 118*b* to atmosphere 118*c*. That is, as time passes, mass transport causes some gas of the atmosphere 118*a* to migrate into atmosphere 118*b* in an inhibited manner, and heat convention/conduction causes an increase in temperature of atmosphere 118*b*. As further time passes, the same happens between atmospheres 118*b* and 118*c*. Eventually, after enough time has passed, the temperatures within all three atmospheres 118*a-c* substantially equalize (as used herein, "substantially equalize" refers to a temperature differential of less than about 10%, such as less than about 5%). This amount of time may be anywhere from about 10 minutes to about 10 hours. As atmospheres 118*a* and 118*b* become hotter, initially, than 118*c*, the getter material is able to react with some of the reactive gasses in these areas first. Mass transport is inhibited into atmosphere 118*c***, wherein, at a later time, the gasses that do transport into the enclosed volume wherein the article of manufacture is held will have a lower concentration of the reactive gasses.

Accordingly, during initial transient operations, the temperature of the atmosphere **118*a* exceeds that of atmosphere 118*b*, which in turn exceeds that of atmosphere 118*c*. As an additional aspect, as the atmospheric gasses pass from atmosphere 118*a* to atmosphere 118*b* to atmosphere 118*c*, they encounter the various placements of getter materials in a progressive fashion (in the containment vessel 110, in the first shroud 120 enclosed volume, and/or in the second shroud 130 enclosed volume). Thus, gasses that pass from the atmosphere 118*a* to the atmosphere 118*b* to the atmosphere 118*c*** should be expected to have progressively lower reactive (undesirable) gas content.

Figure 2:
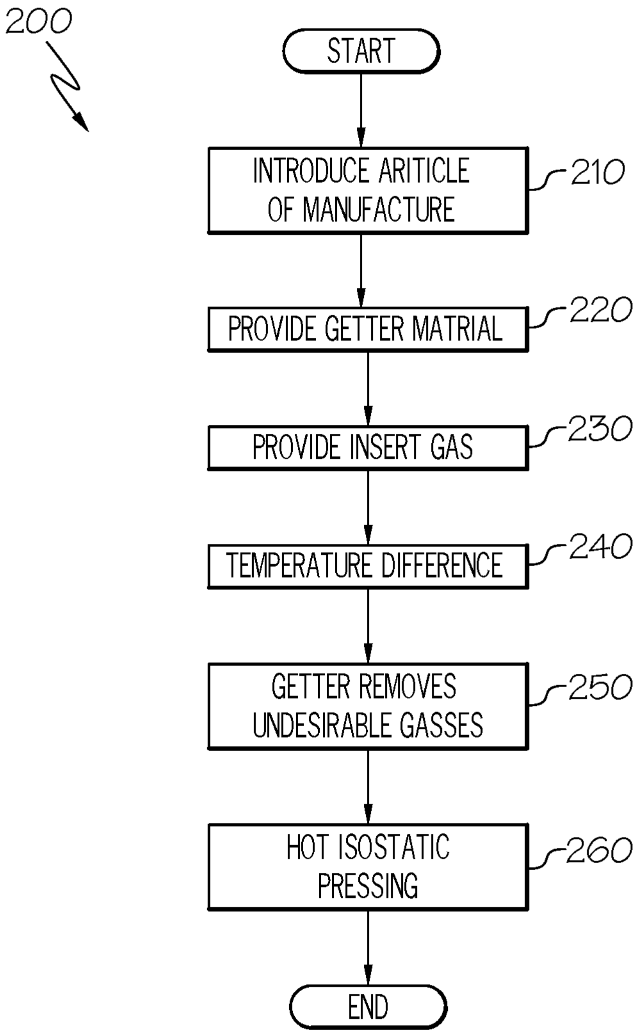
FIG. 2 is a flowchart of a method for HIP processing in accordance with some embodiments of the present disclosure.

In connection with the HIP apparatus 100 described above with regard to FIG. 1, FIG. 2 is a flowchart of a method 200 for HIP processing in accordance with some embodiments of the present disclosure. In method step 210, an article of manufacture is introduced into a first shroud, the first shroud is optionally introduced into a second shroud, and the shroud(s) are introduced into the containment vessel of the HIP apparatus. In method step 220, a getter material is provided in any or all of the first shroud enclosed volume, second shroud enclosed volume, and containment vessel. In method step 230, an inert gas at elevated temperature and pressure is introduced into the containment vessel. At method step 240, a transient temperature difference is formed from the containment vessel atmosphere to the first shroud enclosure atmosphere to the second shroud enclosure atmosphere. Mass transport is retarded or inhibited into the first and/or second shrouds. At method step 250, the getter material removes reactive (undesirable) gasses from the various atmospheres, with those atmospheres being at higher temperature experiencing a greater rate of removal. Further, at method step 260, after a period of time (for example about 10 minutes to about 10 hours), the temperatures equalize in all of the atmospheres, and the article of manufacture is exposed to HIP processing conditions with an atmosphere that has relatively less reactive (undesirable) gas content as compared to the atmosphere that existed immediately after the elevated temperature and pressure inert gas was introduced into the containment vessel (method step 230). As such, the surface area of the article of manufacture experiences less chemical degradation (such as oxidation) as compared to conventional HIP processing.

Accordingly, the present disclosure has provided various embodiments of improved hot isostatic pressing apparatus and hot isostatic pressing methods for reducing surface-area chemical degradation on an article of manufacture. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for hot isostatic pressing comprising the steps of:

providing or obtaining a solid, non-powdered article of manufacture, which comprises a metal alloy or a ceramic;

disposing the article of manufacture in a shroud, the shroud defining a first enclosed volume wherein the article of manufacture is disposed, the shroud being configured as a multi-piece joined structure that retards gaseous mass transport from outside the shroud to inside the first enclosed volume;

disposing the shroud in a containment vessel of a hot isostatic pressing apparatus and disposing a getter material in the containment vessel but outside of the shroud, the containment vessel outside of the shroud defining a second enclosed volume;

withdrawing or evacuating standard atmospheric gasses from within the containment vessel; and introducing an inert gas at an elevated temperature and pressure into the containment vessel for hot isostatic pressing, wherein upon introducing the inert gas at the elevated temperature, the shroud inhibits gaseous mass transport from the second enclosed volume to the first enclosed volume such that the inert gas in the second enclosed volume maintains a higher temperature than the inert gas in the first enclosed volume for a period of time of ten minutes to ten hours, and wherein the temperature of the inert gas within the first enclosed volume increases during the period of time until the temperature of the inert gasses in the first and second enclosed volumes substantially equalize at the end of the period of time.

2. The method of claim 1, wherein the article of manufacture comprises a rotating machine, and wherein the article of manufacture is provided in a solid, non-powdered form.

3. The method of claim 1, further comprising the steps of disposing the shroud in a further shroud and disposing the further shroud in the containment vessel of the hot isostatic pressing apparatus.

4. The method of claim 1, wherein the inert gas comprises argon and the getter material is titanium or zirconium, wherein the getter material is provided to remove any reactive gasses-that are present in the containment vessel.

5. The method of claim 4, wherein the article of manufacture undergoes hot isostatic pressing for a period of time, and wherein the article of manufacture experiences a lesser degree of surface area chemical degradation due to the reactive gasses as compared to conventional hot isostatic pressing.

6. A hot isostatic pressing apparatus comprising:

a sealable containment vessel comprising a first gaseous atmosphere comprising an inert gas and trace amounts of a reactive gas, the first gaseous atmosphere being at a first temperature and a first pressure, wherein the containment vessel has standard atmospheric gasses withdrawn therefrom;

a first shroud disposed in the containment vessel, the first shroud defining a first enclosed volume, wherein the first shroud is configured as a multi-piece joined structure that retards gaseous mass transport from outside the first shroud to inside the first enclosed volume, the containment vessel outside of the first shroud defining a second enclosed volume;

a getter material disposed within the containment vessel but outside of the first shroud, wherein the getter material has an amount of the reactive gas chemically or physically adsorbed thereto; and a solid, non-powdered metal alloy or ceramic article of manufacture having a surface area disposed in the first enclosed volume of the first shroud, wherein at the first temperature and the first pressure, the shroud inhibits gaseous mass transport from the second enclosed volume to the first enclosed volume such that the inert gas in the second enclosed volume is at a higher temperature than the inert gas in the first enclosed volume, and wherein the hot isostatic pressing apparatus is configured to maintain the second enclosed volume at the higher temperature for a period of time of ten minutes to ten hours during which time the temperature in the first enclosed volume is configured to increase such that the first and second enclosed volumes substantially equalize in temperature after the period of time.

7. The apparatus of claim 6, further comprising a second shroud, the second shroud defining an enclosed volume within which the first shroud is disposed.

8. The apparatus of claim 7, wherein the getter material is further incorporated within the enclosed volume of the second shroud, wherein the getter material has an amount of the reactive gas chemically or physically adsorbed thereto.

9. The apparatus of claim 8, wherein the article of manufacture is a component of a rotating machine, optionally a turbine wheel or disk, and wherein the article of manufacture comprises a metal alloy.

10. The apparatus of claim 6, wherein the reactive gas is selected from the group consisting of: an oxygen-containing gas, a carbon-containing gas, and a nitrogen-containing gas; and wherein the getter material is selected from the group consisting of: titanium and zirconium.

11. The apparatus of claim 6, wherein (a) the containment vessel comprises a non-reactive material disposed anywhere around, about, underneath, or over the first shroud; wherein (b) the first shroud comprises a stop-off material positioned in any manner within the first shroud about, around, underneath, or over the article of manufacture; or both (a) and (b).

12. The apparatus of claim 6, wherein the first shroud comprises the multi-piece joined structure that is joined together using a double-walled lip.

13. The apparatus of claim 6, wherein the article of manufacture comprises a copper alloy or a nickel alloy.

14. The apparatus of claim 6, wherein the article of manufacture comprises a turbine wheel or turbine disk.

15. The apparatus of claim 6, wherein the reactive gas comprises oxygen ($O_2$).

16. The apparatus of claim 11, wherein the non-reactive material comprises silica sand.

17. The method of claim 1, wherein the shroud comprises a ceramic material.

* * * * *